United States Patent
Shimizu et al.

(10) Patent No.: US 8,011,485 B2
(45) Date of Patent: Sep. 6, 2011

(54) HYDRAULIC OIL SUPPLY STRUCTURE AND VEHICLE DRIVE APPARATUS PROVIDED WITH THE SAME

(75) Inventors: Tetsuya Shimizu, Anjo (JP); Akira Noguchi, Anjo (JP); Kazuyuki Noda, Anjo (JP); Masaki Yoshida, Okayaki (JP); Tooru Matsubara, Toyota (JP); Kenta Kumazaki, Toyota (JP); Atsushi Tabata, Okayaki (JP); Yuji Iwase, Mishima (JP); Hiroyuki Shibata, Susono (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 662 days.

(21) Appl. No.: 12/076,733

(22) Filed: Mar. 21, 2008

(65) Prior Publication Data

US 2008/0236158 A1    Oct. 2, 2008

(30) Foreign Application Priority Data

Mar. 29, 2007 (JP) .................................. 2007-087720

(51) Int. Cl.
*F16D 67/04* (2006.01)
(52) U.S. Cl. ..................................................... 192/3.57
(58) Field of Classification Search .................. 192/3.57
See application file for complete search history.

(56) References Cited

U.S. PATENT DOCUMENTS

2005/0037883 A1*   2/2005   Motoike et al. ................... 475/5

FOREIGN PATENT DOCUMENTS

| JP | A-61-36541   | 2/1986  |
|----|--------------|---------|
| JP | A 61-52448   | 3/1986  |
| JP | U-62-122970  | 8/1987  |
| JP | A-2-97784    | 4/1990  |
| JP | A-10-252868  | 9/1998  |
| JP | A-2004-353780| 12/2004 |
| JP | A 2005-344938| 12/2005 |

* cited by examiner

*Primary Examiner* — F. Daniel Lopez
(74) *Attorney, Agent, or Firm* — Oliff & Berridge, PLC

(57) ABSTRACT

The hydraulic control apparatus includes a separating plate that is interposed between an upper valve body and a lower valve body. The separating plate and the lower valve body provide a projecting portion that projects toward a discharge opening side of the oil pump with respect to the upper valve body. A first oil feed path is provided at the projecting portion, is formed between the separating plate and the lower valve body, and receives the hydraulic oil from the oil pump and guides the hydraulic oil to an upper valve body disposition side.

12 Claims, 11 Drawing Sheets

Prior Art

HYDRAULIC OIL SUPPLY STRUCTURE AND VEHICLE DRIVE APPARATUS PROVIDED WITH THE SAME

INCORPORATION BY REFERENCE

The disclosure of Japanese Patent Application No. 2007-087720 filed on Mar. 29, 2007 including the specification, drawings and abstract is incorporated herein by reference in its entirety.

BACKGROUND

The present invention relates to a hydraulic oil supply structure and a vehicle drive apparatus provided with a hydraulic oil supply structure.

Therein exists a hydraulic oil supply structure that is used in a automatic transmission. Here, examples of an oil pump include a mechanical oil pump that works by obtaining a rotational drive power from a rotational drive shaft that is provided in the automatic transmission or an electrical oil pump that works by receiving a supply of electrical power from a battery. Hydraulic oil that is output by these oil pumps is fed to a hydraulic pressure control apparatus and is used in an automatic transmission for a variety of necessary purposes. A typical use is the lubrication of the gear train that is provided in the automatic transmission, the supplying of the operating oil to the friction engaging mechanism, and the supplying of cancel oil.

An example of a hydraulic control apparatus that has been proposed is one that has a structure provided with an upper valve body and a lower valve body, and having a separating plate interposed therebetween (see, for example, Japanese Patent Application Publication No. JP-A-S61-52448 and Japanese Patent Application Publication No. JP-A-2005-344938). In this type of hydraulic control apparatus, provided that the separating plate that can be manufactured by stamping a plate body and the respective valve bodies of the upper and lower valve bodies, which are suitably defined in order to form a desired hydraulic circuit, it is possible to obtain multi-purpose hydraulic control circuits comparatively easily.

Japanese Patent Application Publication No. JP-A-S61-52448 discloses an automatic transmission for a 4-wheel drive vehicle, and excluding the intake system for the mechanical oil pump, the ends of the upper and lower valve bodies on the vehicle front side are flush in the axial direction of the drive shaft.

Japanese Patent Application Publication No. JP-A-2005-344938 is related to an automatic transmission having an assist hydraulic unit attached, and in this example, the end of the lower valve body on the vehicle front side projects further to the front than the end of the upper valve body on the vehicle front side.

Because this prior art relates to automatic transmissions, the distance from the oil pump, which is for obtaining hydraulic oil, to the end of the hydraulic control apparatus on the oil pump side is comparatively short.

SUMMARY

In addition, in the example that is disclosed in Japanese Patent Application Publication No. JP-A-S61-52448, substantially the entire separating plate is interposed between both the upper and the lower valve bodies. Thus, even if an oil path is provided in which the hydraulic oil that has been discharged from the oil pump, which is between the separating plate and the lower valve body, is flowing, a sufficient interface pressure cannot be ensured.

In addition, in the example that is disclosed in Japanese Patent Application Publication No. JP-A-2005-344938, as shown by enlargement in FIG. 14 of the specification of the present application, the drive apparatus case on which the oil pump OPm is installed and the upper valve body UVB are sufficiently close. It is thus possible to ensure a sufficient interface pressure even if the oil path is provided on the projecting portion PP of the lower valve body LVB, where the oil path is one in which the hydraulic oil that has been discharged from the oil pump OPm flows between the separating plate SP and the lower valve body LVB.

Conventionally, what is referred to as a hybrid vehicle, that is, a vehicle that is provided with an engine and a rotary electric motor as drive sources, has been proposed with the object of improving fuel economy and the like. As an example of this type of hybrid vehicle, one has been proposed that is provided with, in order of disclosure along the longitudinal direction of the vehicle: an engine, a rotary motor, and a transmission that obtains rotational drive power therefrom. With this construction, the disposition position of the oil pump is normally on the input shaft side of the drive apparatus. In contrast, at least a portion of the hydraulic control apparatus is disposed in the area below the transmission for the reasons that hydraulic oil is supplied to the friction engaging elements (multi-plate clutches and multi-plate brakes and the like) that are provided in the transmission, and that various prescribed lubricated portions that are disposed inside the speed change mechanism are advantageously lubricated.

When such a structure is used, the distance between the oil-pump, and further, the drive apparatus case in which the oil pump is mounted, and the end face of the upper valve body on the oil pump side becomes long. In order to feed oil from the oil pump into the hydraulic control apparatus, it is necessary to provide an oil feed path that is formed therebetween by the separating plate and the lower valve body. In such a structure, there is a problem in that the interface pressure in this oil feed path is difficult to ensure. In other words, this is because the seal in the space between the lower valve body and the separating plate becomes inadequate.

This type of problem is not limited to hybrid drive apparatuses that are provided with a rotary electric motor. Even in an automatic transmission that is not provided with a rotary electric motor, the distance between the oil pump and the end face of the hydraulic control apparatus on the oil pump side becomes comparatively long, and in a hydraulic control apparatus in which the lower valve body is provided with a projecting portion that projects on the oil pump side (normally, the front side of a vehicle) with respect to the upper valve body, there are cases in which this problem occurs.

Thus, the present invention provides a hydraulic oil supply apparatus that can feed hydraulic oil to a hydraulic control apparatus advantageously in a hydraulic oil supply structure that has a structure in which the distance between the oil pump and the hydraulic control apparatus is comparatively long. The present invention can also achieve various other advantages.

A hydraulic oil supply structure according to an exemplary aspect of the present invention includes an oil pump; a case for a drive apparatus; and a hydraulic control apparatus to which hydraulic oil that has been discharged from the oil pump is supplied and which is disposed in an area below the drive apparatus. The hydraulic control apparatus includes a separating plate that is interposed between an upper valve body and a lower valve body. The separating plate and the lower valve body provide a projecting portion that projects toward a discharge opening side of the oil pump with respect to the upper valve body. A first oil feed path is provided at the projecting portion, is formed between the separating plate and the lower valve body, and receives the hydraulic oil from the oil pump and guides the hydraulic oil to an upper valve body disposition side. A descending wall is provided that descends from the case at a position opposed to an upper end of a sealing wall portion of the lower valve body, with the separating plate interposed between the descending wall and the sealing wall portion.

BRIEF DESCRIPTION OF THE DRAWINGS

Various exemplary aspects of the invention will be described with reference to the drawings wherein.

DETAILED DESCRIPTION OF EMBODIMENTS

A vehicle drive apparatus 1 that is provided with a hydraulic oil supply apparatus according to the present invention will be explained below with reference to the figures.

Figure 1:
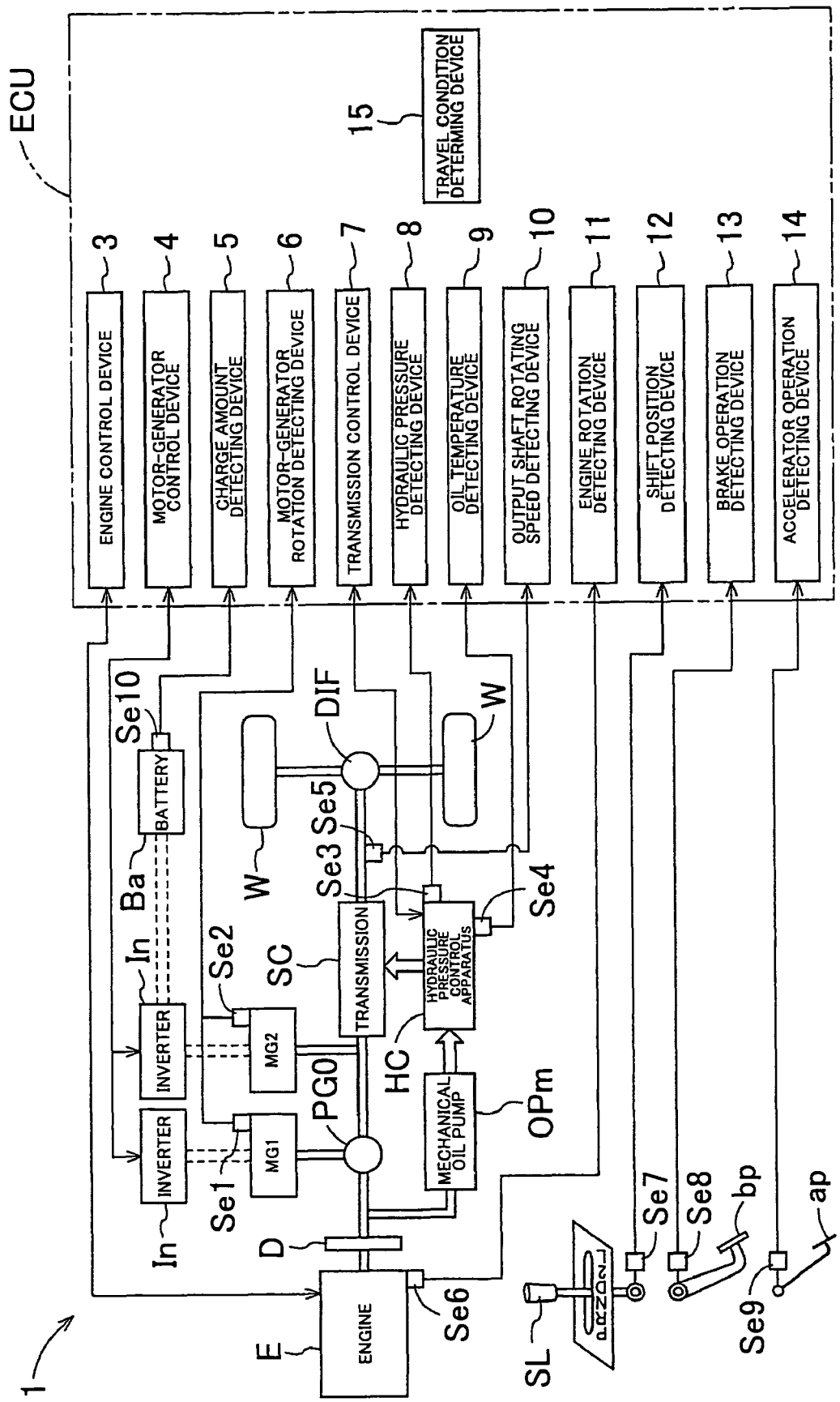
FIG. 1 is a block drawing that schematically shows a structure of a vehicle that includes a vehicle drive apparatus according to an embodiment of the present invention.
Figure 2:
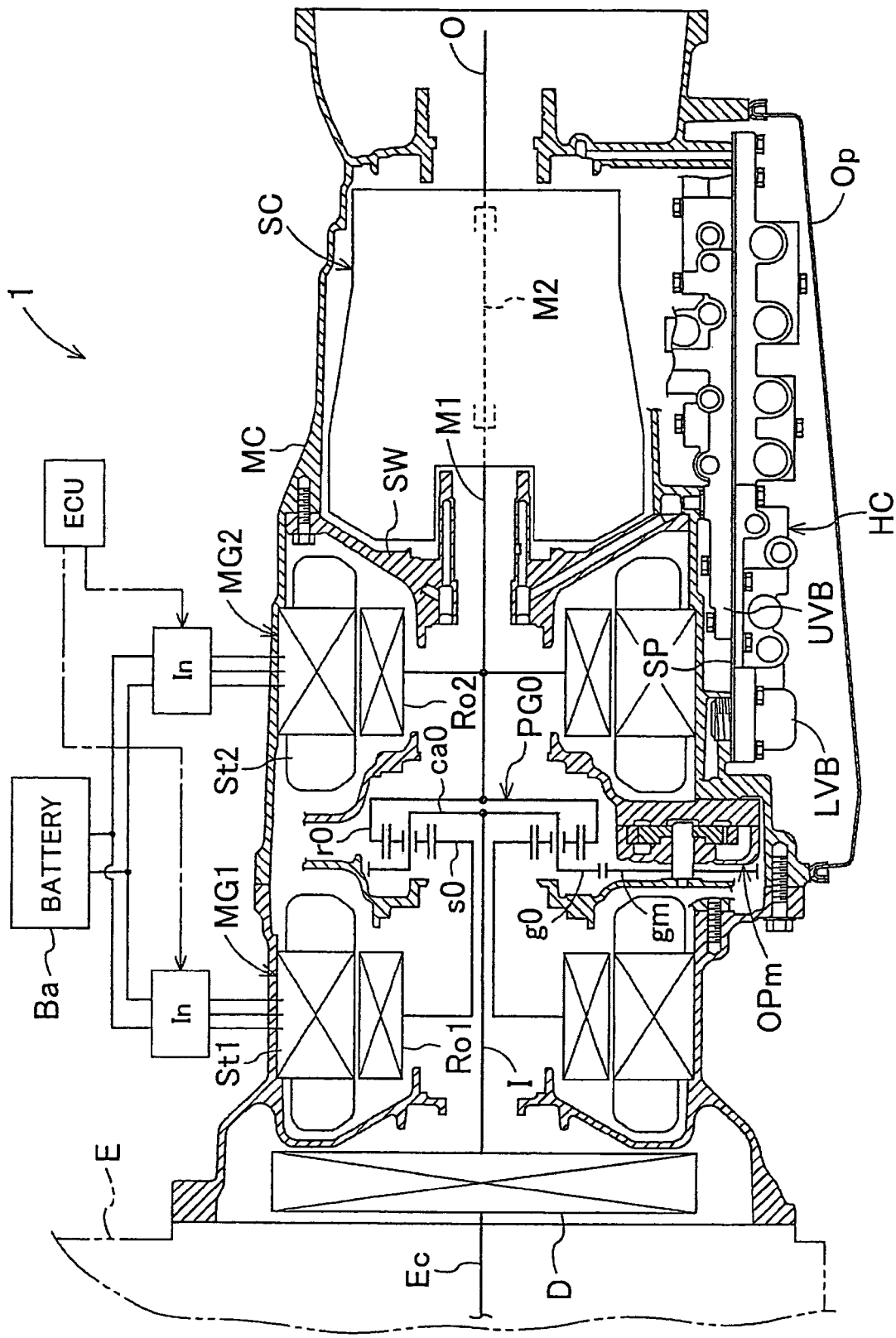
FIG. 2 is a cross-sectional drawing that shows a basic structure of the vehicle drive apparatus according to an embodiment of the present invention.

In this embodiment, as an example, a case is explained in which the present invention is applied to a drive apparatus I of a hybrid vehicle. FIG. 1 is a block drawing that schematically shows the structure of a vehicle that includes the vehicle drive apparatus 1 according to the present embodiment. As shown in the figure, the vehicle drive apparatus 1 is provided along a transfer path of the drive power between an engine E and wheels W. In addition, FIG. 2 is a cross-sectional diagram that shows the basic form of the structure of the vehicle drive apparatus 1 according to the present embodiment. Note that in FIG. 2, a first motor-generator MG1, a second motor-generator MG2, a power distribution mechanism PG0, and a transmission SC are shown schematically. In addition, the engine E, a battery Ba, inverters In, and a control unit ECU, which are connected to the vehicle drive apparatus 1, are also shown schematically.

1. Overall Structure of the Vehicle Drive Apparatus 1

First, the structure of the vehicle drive apparatus 1 according to the present embodiment will be explained with reference to FIG. 2. As shown in this figure, the vehicle drive apparatus 1 is provided as principal structures with the first motor-generator MG1, the second motor-generator MG2, the power distribution mechanism PG0, and the transmission SC. In addition, the vehicle drive apparatus 1 is provided with an input shaft I that is drive linked to the engine E, an output shaft O that is drive linked to the wheels W (refer to FIG. 1), and a first intermediate shaft M1 that carries out the transfer of the drive power between the input shaft I and the output shaft O. Furthermore, in the transmission SC, a second intermediate shaft M2 is provided. In the present example, these shafts are disposed coaxially to a drive shaft (crank shaft) Ec to which the drive power of the engine E is output, in the sequence from the front side: input shaft I, first intermediate shaft M1, second intermediate shaft M2, and the output shaft O. Note that in the explanation of the present embodiment, the engine E side is the front side (the left side in FIG. 2), and the output shaft O side is the back side (the right side in FIG. 2).

A damper apparatus D is provided between the drive shaft Ec and the input shaft I. This damper shaft D absorbs the fluctuations in the output of the engine E and transfers the resulting output to the output shaft I. Note that a structure is also possible in which the damper apparatus D is not provided and the drive shaft Ec and the input shaft I are integrated. In addition, the power distribution mechanism PG0 is provided between the input shaft I and the first intermediate shaft M1. This power distribution mechanism PG0 distributes and transfers the drive power that has been transferred from the engine E via the damper apparatus D and the input shaft I to the first motor-generator MG1 and the first intermediate shaft M1 as necessary. Thereby, this vehicle drive apparatus 1 is structured as a split type that has two motor-generators, i.e., the first motor-generator MG1 and the second motor-generator MG2. Note that a mechanical oil pump OPm is disposed below the power distribution mechanism PG0. In addition, the transmission SC is disposed between the first intermediate shaft M1 and the output shaft O. The second intermediate shaft M2 is structured such that the rotation of the first intermediate shaft M1 is selectively transferred due to a first clutch, and is structured so as to rotate relatively to the output shaft O.

Each of the structures of the vehicle drive apparatus 1 described above are housed inside a case MC, which is formed as a long cylinder in the longitudinal direction and such that the size in the radial direction becomes smaller toward the back side. Specifically, in sequence from-the engine E side to the output shaft O side, the damper apparatus D, the first motor-generator MG1, the power distribution mechanism PG0, the second motor-generator MG2, and the transmission SC are disposed and housed. Here, a separating wall SW is provided between the second motor-generator MG2 and the transmission SC. In addition, at the bottom of the outer wall of the case MC, this vehicle drive apparatus 1 includes a hydraulic control apparatus HC, which controls the supply of the oil that is supplied from the mechanical oil pump OPm to the each of the components, and an oil pan Op, which stores oil. Note that while the engine E is operating, oil is supplied to the hydraulic control apparatus HC from the mechanical oil pump OPm. In addition, the output shaft O of this vehicle drive apparatus 1 transfers the drive power to the wheels W via a differential apparatus DIF (refer to FIG. 1) and a transfer apparatus for a four-wheel drive (not illustrated).

Note that in the present embodiment, the first motor-generator MG1 and the second motor-generator MG2 correspond to the "rotary electric motors" in the present invention.

Figure 3:
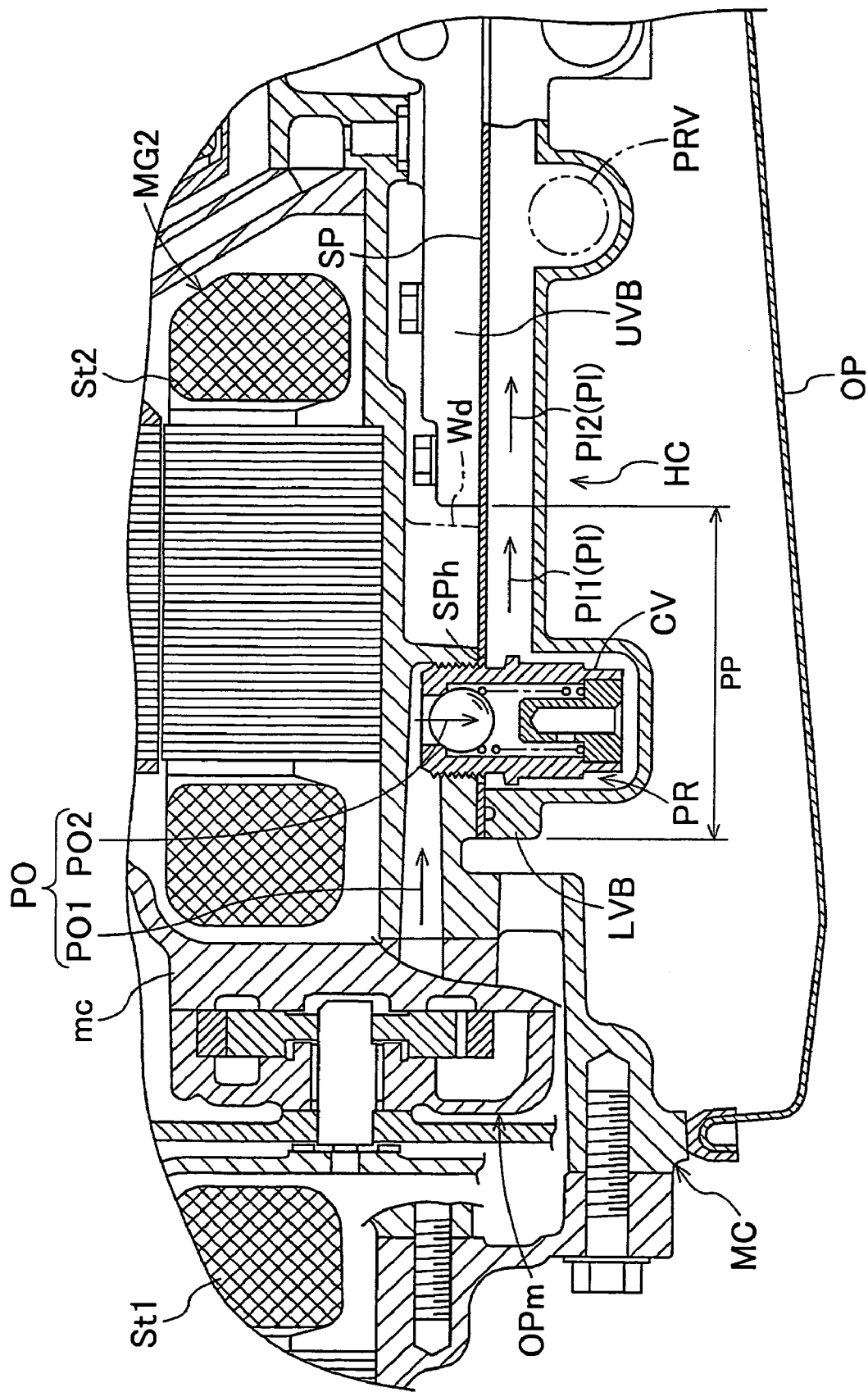
FIG. 3 is a longitudinal sectional view of an area in proximity to an oil pump and a projecting portion.

As shown in FIG. 3, the mechanical oil pump OPm is installed on an inside wall mc of the case MC, and the hydraulic oil that is discharged from the discharge opening of this oil pump OPm is fed to the hydraulic control apparatus HC side via a hydraulic oil feed path PO that is provided in the case MC. This hydraulic oil feed path PO is structured by an axial direction portion PO1, which is provided on the oil pump OPm side and extends in an axial direction, and a descending portion PO2, which is provided on the distal end side of this axial direction portion PO1 and feeds the hydraulic oil downward. As can be understood from FIG. 3 as well, the distal end portion of a check valve CV on the inflow side is disposed by being inserted at the descending portion PO2.

As can be understood from FIG. 2 and FIG. 3, the hydraulic control apparatus HC is structured by being provided with an upper valve body UVB on the upper side and being provided with a lower valve body LVB on the lower side, and a separating plate SP is interposed therebetween. These are integrally fastened, and are provided for the purpose of prescribed lubrication. It is well known that in the hydraulic control apparatus HC, a plurality of valves are operably provided that can be operated depending on prescribed objects, and that it is possible to form a plurality of oil paths depending on these objects and provide these oil paths for use in lubrication and the operation of the friction engaging elements and the like.

The hydraulic control apparatus HC is also provided with a projecting portion PP, in which the separating plate SP and the lower valve body LVB project on the discharge opening side of the oil pump OPm with respect to the upper valve body UVB. This projecting portion PP is provided with an oil feed path PI that is formed between the separating plate SP and the lower valve body LVB and receives the hydraulic oil from the oil pump OPm.

More specifically, as shown in FIG. 3, a hydraulic oil receiving hole SPh is provided in the separating plate SP so as to be opposed to the descending portion PO2 of the fed oil path PO of the case MC, and a hydraulic oil receiving chamber PR is provided on the lower valve body LVB that is disposed below this hydraulic oil receiving hole SPh. In addition, the check valve CV, which prevents the reverse flow of the hydraulic oil from the hydraulic oil receiving chamber PR side to the case MC side, is provided so as to pass through the descending portion PO2 of the case MC, the hydraulic oil receiving hole SPh, and the hydraulic oil receiving chamber PR. Therefore, in FIG. 3, the check valve CV prevents the reverse flow of the hydraulic oil from the lower valve body LVB to the case MC side.

A structure is used in which the oil feed path PI extends from this hydraulic oil receiving chamber PR to the downstream side of the path for the hydraulic oil.

2. Structure of Each of the Components of the Vehicle Drive Apparatus 1

As shown in FIG. 2, the power distribution mechanism PG0 is structured by a single pinion planetary gear mechanism that is disposed coaxially to the input shaft I. Specifically, the power distribution mechanism PG0 includes a carrier ca0 that supports a plurality of pinion gears, and a sun gear s0 and a ring gear r0 that each mesh with the pinion gears to serve as rotating elements. In this power distribution mechanism PG0, the carrier ca0 is linked so as to rotate integrally with the input shaft I, the sun gear s0 is linked so as to rotate integrally with a rotor Ro1 of the first motor-generator MG1, and the ring gear r0 is linked so as to rotate integrally with the first intermediate shaft M1. Thereby, the power distribution mechanism PG0 distributes the drive power that is transferred from the engine E to the carrier ca0 via the input shaft I to the first motor-generator MG1 side or the first intermediate shaft M1 side depending on the rotational control of the first motor-generator MG1. Note that the drive power that is distributed to the first motor-generator MG1 is mainly provided for power generation, and the drive power that is transferred to the first intermediate shaft M1 is mainly provided for the vehicle travel. In addition, a drive gear g0 for driving the mechanical oil pump OPm is linked to the carrier ca0 of the power distribution mechanism PG0 so as to rotate integrally therewith. This drive gear g0 is provided so as to mesh with a driven gear gm, which rotates integrally with a rotation shaft of the mechanical oil pump OPm.

The first motor-generator MG1 includes a stator St1 that is held stationary on the case MC and the rotor Ro1 that is supported so as to rotate freely in the radial direction inside the stator St1. The rotor Ro1 of this first motor-generator MG1 is linked with the sun gear s0 of the power distribution mechanism PG0 so as to rotate integrally therewith. In addition, the second motor-generator MG2 includes a stator St2 that is held stationary on the case MC and a rotor Ro2 that is supported so as to rotate freely in the radial direction inside the stator St2. The rotor Ro2 of the second motor-generator MG2 is linked to the first intermediate shaft M1 so as to rotate integrally therewith. The first motor-generator MG1 and the second motor-generator MG2 are electrically connected to the battery Ba, which serves as an accumulating device, via the respective inverters In. In addition, the first motor-generator MG1 and the second motor-generator MG2 can each function as a motor that receives a supply of electrical power and generates power, or function as a generator that receives a supply of power and generates electrical power.

In the present example, the first motor-generator MG1 mainly carries out power generation by using the drive power that is input via the sun gear s0, charges the battery Ba, or drives the second motor-generator MG2. However, while the vehicle is traveling at a high speed, the first motor-generator MG1 may also function as a motor. In contrast, the second motor-generator MG2 mainly functions as a drive motor that assists the drive power for vehicle travel. However, while the vehicle is decelerating, the second motor-generator MG2 functions as an electric power generator, and regenerates the inertia of the vehicle as electrical energy. The operations of the first motor-generator MG1 and the second motor-generator MG2 are carried out according to control commands from the control unit ECU.

The transmission SC is structured, for example, by a planetary gear apparatus PGS that includes one planetary gear mechanism or combines a plurality of sets of planetary gear mechanisms. The transmission SC is provided with a plurality of friction engaging elements depending on the rotating elements that structure the planetary gear apparatus. Specifically, the transmission SC is provided with a predetermined number of clutches and brakes and the like that function as these friction engaging elements.

In this transmission SC, any two friction engaging elements are engaged for each shift speed, and the remaining friction engaging elements are disengaged. Thereby, each of the shift speeds is selected and set. The operation of these friction engaging elements is determined by the hydraulic oil that is appropriately supplied from the hydraulic control apparatus HC according to the travel state of the vehicle.

3. Structure of the Control Unit ECU

Next, the structure of the control unit ECU, which functions as the control device for the vehicle drive apparatus 1 according to the present embodiment will be explained with reference to FIG. 1. Note that in this figure, the solid double lines show the transfer path of the drive power, the double broken lines show the transfer path of the electrical power, and the hollow arrows show the flow of the oil. In addition, the solid arrows show the transfer path for various types of information.

This control unit ECU carries out the operational control of the engine E, the first motor-generator MG1, the second motor-generator MG2, and, via the hydraulic control apparatus HC, each of the friction engaging elements of the transmission SC by using information that has been acquired from the sensors Se1 to Se10, which are installed in each part of the vehicle. In the present example, a first motor-generator rotating speed sensor Se1, a second motor-generator rotating speed sensor Se2, a hydraulic pressure sensor Se3, an oil temperature sensor Se4, an output shaft rotating speed sensor Se5, an engine rotating speed sensor Se6, a shift position detecting sensor 7, a brake operation detecting sensor Se8, an accelerator operation detecting sensor Se9, and a charge amount detecting sensor Se10 are provided as the sensors Se1 to Se10.

Here, the first motor-generator rotating speed sensor Se1 is a sensor for detecting the rotating speed of the rotor Ro1 of the first motor-generator MG1. The second motor-generator rotating speed sensor Se2 is a sensor for detecting the rotating speed of the rotor Ro2 of the second motor-generator MG2. The hydraulic pressure sensor Se3 is a sensor for detecting the base hydraulic pressure, which is the hydraulic pressure of the oil that is supplied to the hydraulic control apparatus HC. The oil temperature sensor Se4 is a sensor for detecting the oil temperature, which is the temperature of the oil that is supplied from the hydraulic control apparatus HC. The output shaft rotating speed sensor Se5 is a sensor for detecting the rotating speed of the output shaft O. The engine rotating speed sensor Se6 is a sensor for detecting the rotating speed of a drive shaft Ec of the engine E. The shift position detecting sensor Se7 is a sensor for detecting the selected position of a shift lever SL for operating the transmission SC. The brake operation detecting sensor Se8 is a sensor for detecting the presence or the absence of the operation of a brake pedal pb, which is linked to a wheel brake (not illustrated) for decelerating the rotation of the wheels W (wheels). The accelerator operation detecting sensor Se9 is a sensor for detecting the presence or the absence of the operation of an accelerator pedal ap. The charge amount detecting sensor Se10 is a sensor for detecting the charge amount of the battery Ba.

In addition, the control unit ECU is provided with an engine control device 3, a motor-generator control device 4, a charge amount detecting device 5, a motor-generator rotation detecting device 6, a transmission control device 7, a hydraulic pressure detecting device 8, an oil temperature detecting device 9, an output shaft rotating speed detecting device 10, an engine rotation detecting device 11, a shift position detecting device 12, a brake operation detecting device 13, an accelerator operation detecting device 14, and a travel condition determining device 15. Each of these-devices in the control unit ECU is structured such that the arithmetic processing device such as a CPU serves as the central member and the functional portions for carrying out the various processes on the data that has been input are provided by hardware, software (programs) or both.

The engine control device 3 carries out, for example, the operational control of, for example, the start-up and stopping, the rotating speed control, and the output torque control of the engine E. For example, in hybrid travel that prioritizes fuel economy, the operational control of the engine is carried out according to the engine operating points (the rotating speed and the output torque) that has been determined by the travel condition determining device 15.

The motor-generator control device 4 carries out the operational control of, for example, the rotating speed control and the rotating torque control of the first motor-generator MG1 and the second motor-generator MG2 via the inverter In. Specifically, the rotating speed control is carried out by controlling the frequency of the electrical power that is supplied to the first motor-generator MG1 and the second motor-generator MG2. In addition, the rotating torque control is carried out by controlling the current or the voltage that is supplied to the first motor-generator MG1 and the second motor-generator MG2. For example, in hybrid travel that prioritizes fuel economy, operational control of the motor-generators is carried out according to the motor-generator operating points (rotating speed and rotating torque) that has been determined for these motor-generators by the travel condition determining device 15.

The charge amount detecting device 5 carries out processing in which the charge amount of the battery Ba is detected based on the output from the charge amount detecting sensor Se10.

The motor-generator rotation detecting device 6 detects the rotating speed of the first motor-generator MG1 and the second motor-generator MG2 based on the output of the first motor-generator rotating speed sensor Se1 and the second motor-generator rotating speed sensor Se2.

The transmission control device 7 carries out the engagement and disengagement of each of the friction engaging elements of the transmission SC, that is, in the present example, the clutches and brakes, and selects the shift speed of the transmission SC by controlling the operation of the hydraulic control apparatus HC.

The hydraulic pressure detecting device 8 detects the base hydraulic pressure, which is the pressure of the oil that is supplied to the hydraulic control apparatus HC, based on the output from the hydraulic pressure sensor Se3. The oil temperature detecting device 9 detects the oil temperature, which is the temperature of the oil that is supplied from the hydraulic control apparatus HC to each of the parts of the transmission SC, based on the output from the oil temperature sensor Se4.

The output shaft rotating speed detecting device 10 detects the rotating speed of the output shaft O of the vehicle drive apparatus 1 based on the output from the output shaft rotating speed sensor Se5.

The engine rotation detecting device 11 detects the rotating speed of the drive shaft Ec of the engine E based on the output from the engine rotating speed sensor Se6.

The shift position detecting device 12 detects the selected position of the shift lever SL based on the output from the shift position detecting sensor Se7. In the present example, the shift position detecting device 12 detects whether any among the following ranges has been selected: the "P (parking)", "R (reverse)", "N (neutral)", "D (drive)", "2 (second)", or "L (low)".

The brake operation detecting device 13 detects the absence or the presence of an operation of the wheel brake, or specifically, the operation of the brake pedal bp, by the driver of the vehicle based on the output from the brake operation detecting sensor Se8. In the present example, the brake operation is detected as being ON when the brake pedal bp is being operated, and the brake operation is detected as being OFF when the brake pedal bp is not being operated.

The accelerator operation detecting device 14 detects the presence or absence of the operation of the accelerator pedal ap by the driver of the vehicle based on the output from the accelerator operation detecting sensor Se9. In the present example, the acceleration operation is detected as being ON when the accelerator pedal ap is being operated, and the accelerator operation is detected as being OFF when the accelerator pedal ap is not being operated.

The travel condition determining device 15 determines the shift speed of the transmission SC based on a speed change map that has been found in advance, based on the output shaft rotating speed that has been detected by the output shaft rotating speed detecting device 10, which is equivalent to the travel speed, and the required drive power, which is determined based on the operating amount that is detected by the brake operation detecting device 13 and the accelerator operation detecting device 15. The shift speed that has been found in this manner is sent to the transmission control device 7, and thereby the shift speed of the transmission SC is controlled.

Furthermore, this travel condition determining device 15 determines the engine operating points (the rotating speed and the output torque) and the motor-generator operating points (the rotating speed and the rotating torque) in relation to the required drive power that is found in the manner that has been described above. The engine operating points and the motor-generator operating points that have been found in this manner are each sent to the engine control device 3 and the motor-generator control device 4, and the operation control of the engine E and the motor-generators MG1 and MG2 is performed.

For example, in when travel control is carried out that prioritizes fuel economy, the operating points of the engine E are determined based on the engine operating points map for prioritizing fuel economy and has been found in advance, and the operating points of the second motor-generator MG2 are determined so as to supplement torque that is insufficient when only the engine output is used by the motor-generators. The operating points of the other motor-generator MG1 are determined such that the requirements of the power distribution in the power distribution mechanism PG0 are satisfied.

Figure 4:
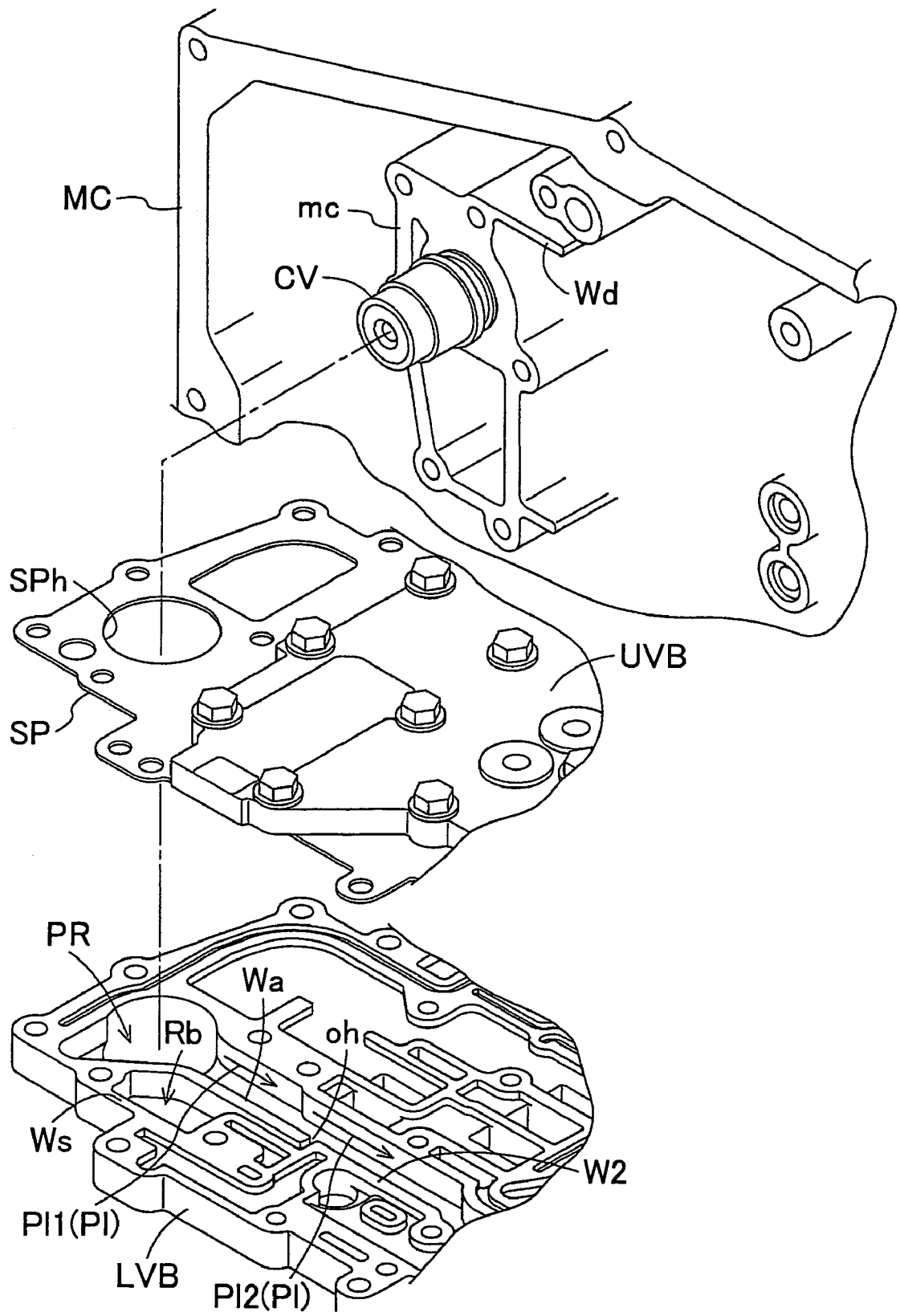
FIG. 4 is an exploded perspective view of the area in the proximity of a portion of a first embodiment.
Figure 5:
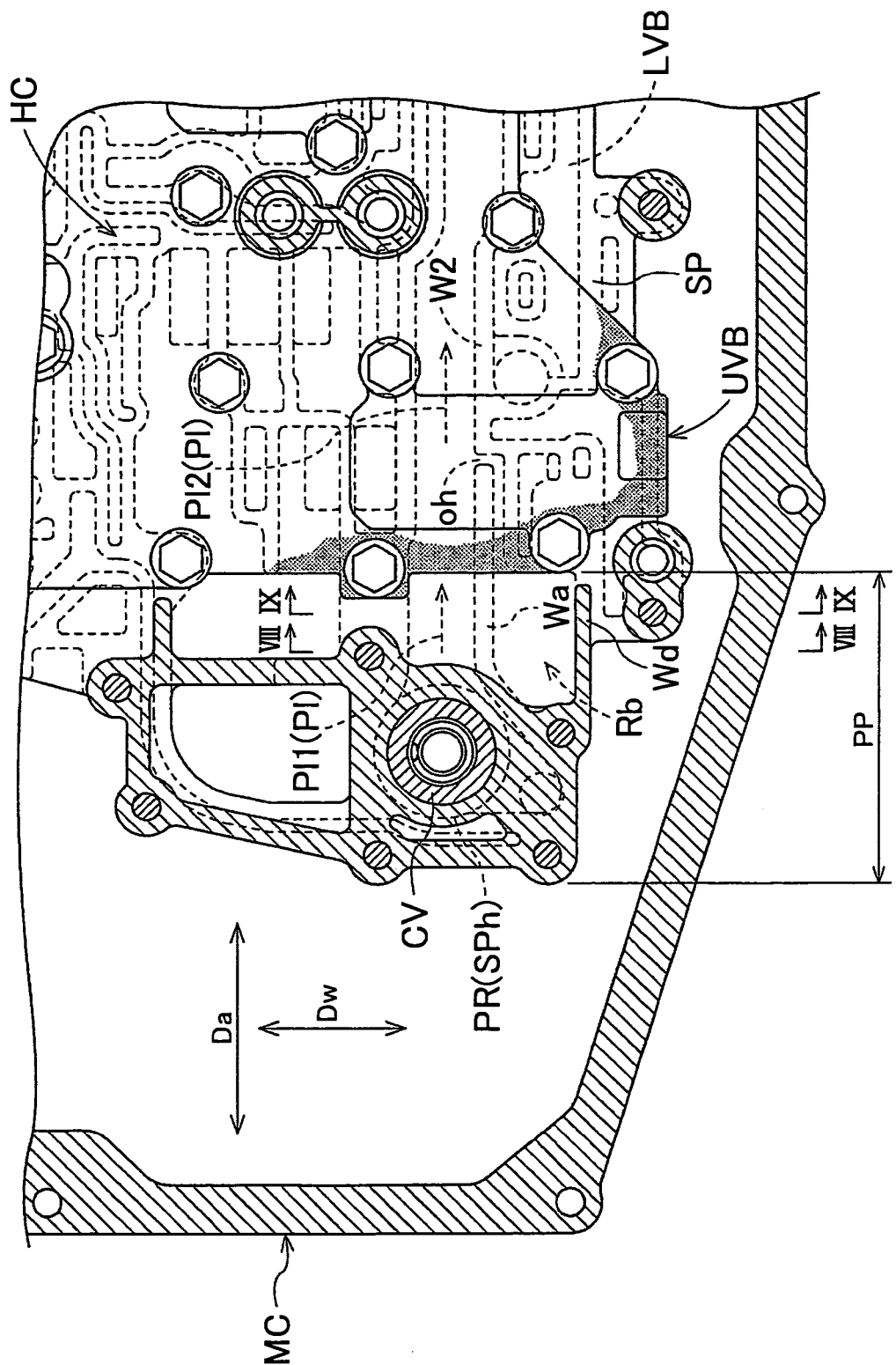
FIG. 5 is a plane view of the area in the proximity of the portion of the first embodiment.
Figure 6:
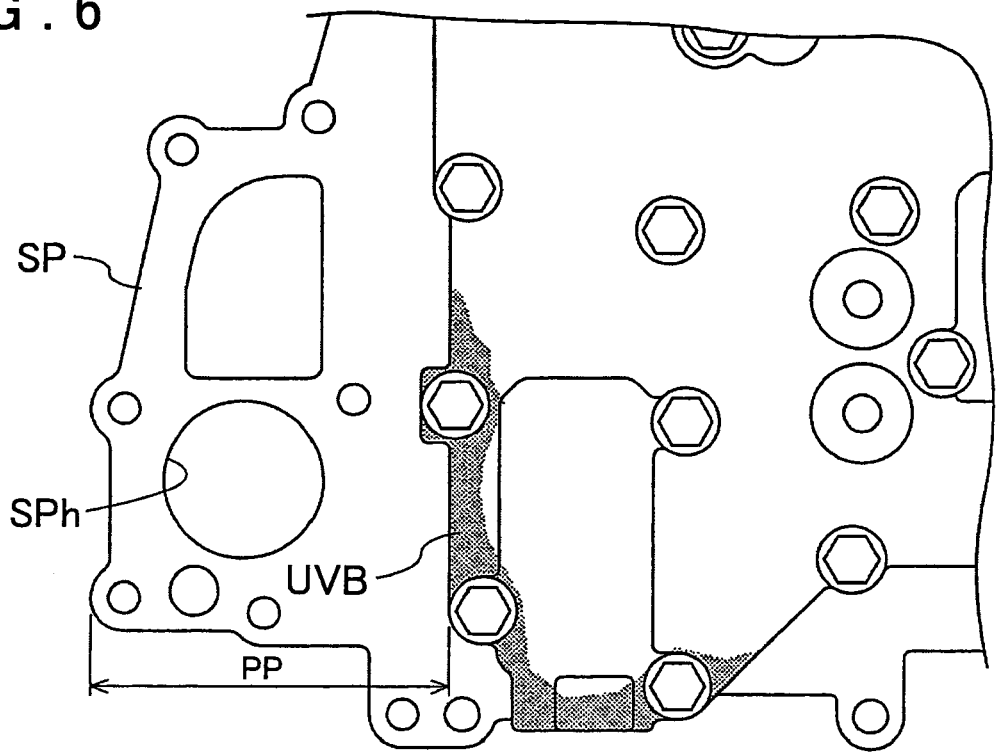
FIG. 6 is a plane view of a portion of a hydraulic control apparatus according to the first embodiment.

4. Hydraulic Pressure Supply from the Oil Pump to the Hydraulic Control Apparatus Inlet Next, the supply structure for the hydraulic oil from the oil pump OPm to the inlet of the hydraulic control apparatus HC will be explained with reference to the figures. FIG. 3 shows the structure of the oil path from the oil pump OPm to the primary regulator valve PRV that is provided in the hydraulic control apparatus HC, and the hydraulic oil that has been discharged from the oil pump OPm enters inside the hydraulic control apparatus HC via the check valve CV, and arrives at the primary regulator valve PRV via the oil feed path PI that is provided in the apparatus HC. FIG. 4 is an exploded perspective view that shows the structure in proximity to the elements of the hydraulic oil supply structure according to the present embodiment. FIG. 5 is a plane view of the area in proximity to the elements of the hydraulic oil supply structure according to the present embodiment. This figure shows the relationship between the hydraulic control apparatus HC and the case MC by showing the cross-sectional contour of the case MC. FIG. 6 is a plane view in which the hydraulic control apparatus HC is viewed from the upper valve body UVB side. In this figure, the planar outer contour of the upper valve body UVB is shown, and the planar outer contour of the separating plate SP that is provided therebelow is shown. In the present application, the planar outer contour of the lower valve body LVB viewed from the top side is substantially identical to that of the separating plate SP.

Figure 7:
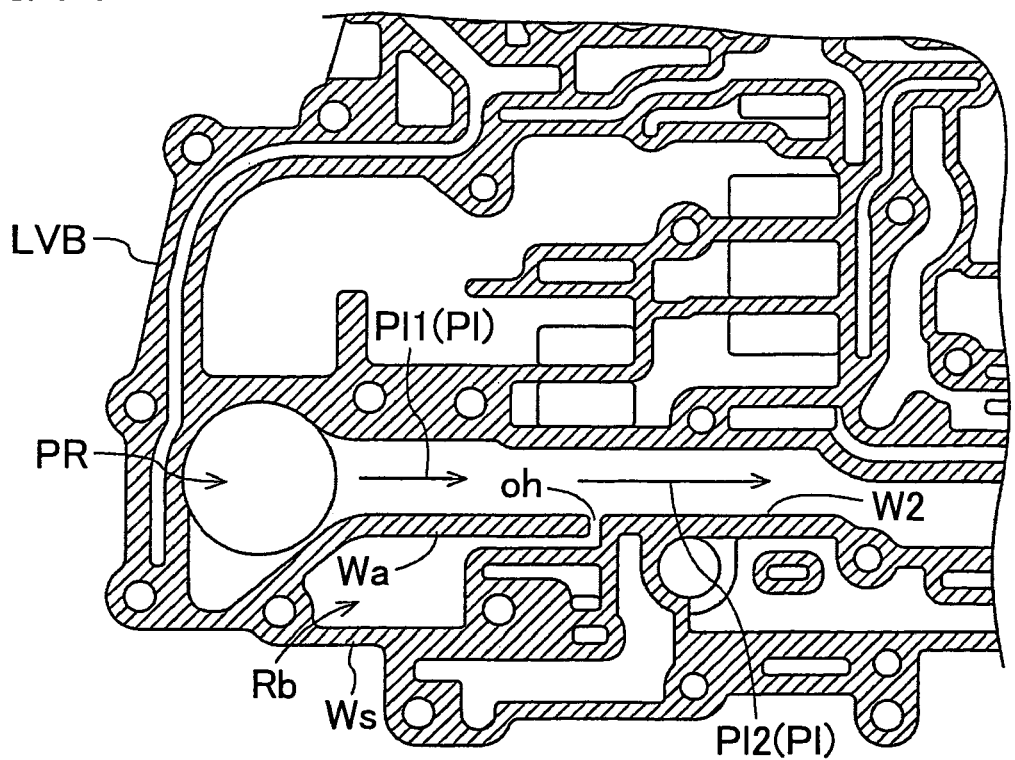
FIG. 7 is a plane cross-sectional view that shows a flow path structure of a lower valve body of the first embodiment.
Figure 8:
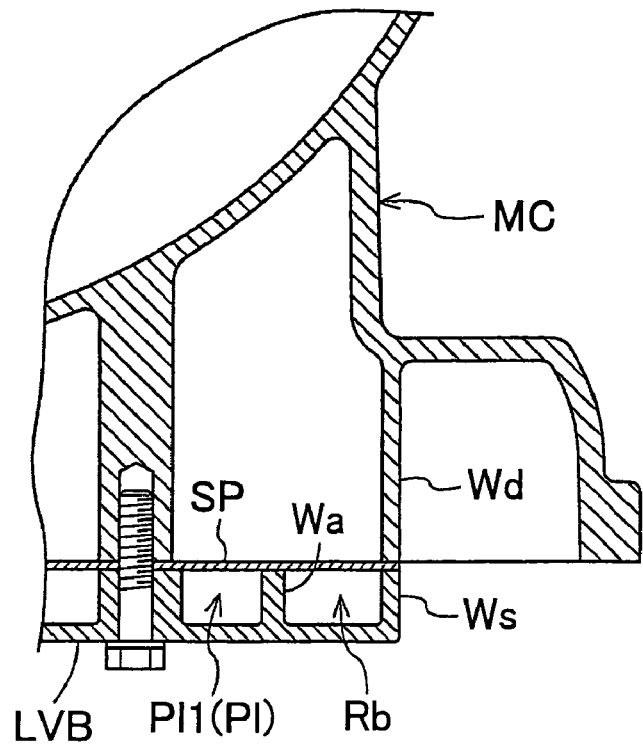
FIG. 8 is a drawing that shows a VII-VII cross-section in FIG. 5 according to the first embodiment.
Figure 9:
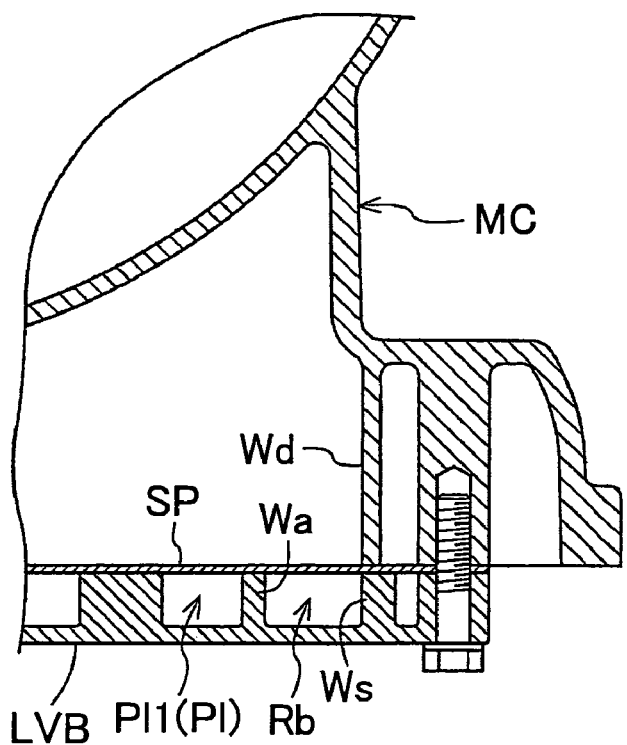
FIG. 9 is a drawing that shows a IX-IX cross-section in FIG. 5 according to the first embodiment.

FIG. 7 is a plane cross-sectional view that shows the structure of the flow paths in the lower valve body LVB. FIG. 8 shows the cross-sectional contour along the VIII-VIII cross-sectional surface in FIG. 5. FIG. 9 shows the cross-sectional contour along the IX-IX cross-sectional surface in FIG. 5. In FIG. 7, the hole that is seen on the lower left side on the cross-sectional surface is the hydraulic oil receiving chamber PR, which has been explained above, and the hydraulic oil enters the back side (in the lower valve body LVB) from the paper surface side (the case MC side). In FIG. 7, the hydraulic oil that has entered the lower valve body LVB is guided to the inner portion side (the side where the upper valve body UVB is located) of the hydraulic control apparatus HC via the oil feed path PI, which extends in the left-to-right direction, and is then guided to the primary regulator valve PRV (refer to FIG. 3).

The characteristic feature of the present application lies in the structure of this oil feed path PI (the seal structure between the separating plate SP and the lower valve body LVB, at a position at which the upper valve body UVB is not present).

As shown in FIG. 3 and FIG. 4, this oil feed path PI is defined by the separating plate SP and the lower valve body LVB. In addition, in order to ensure the seal between the separating plate SP and the lower valve body LVB, a first oil feed path PI1 that ensures the seal by providing a descending wall Wd, which substantially descends from the case MC, and a second oil feed path PI2 that ensures the seal by the upper valve body UVB being fastened to the lower valve body LVB with the separating plate SP interposed therebetween, are provided. In FIG. 3 and FIG. 4, the oil path that is located on the check valve CV side is referred to as the first oil feed path PI1, and the oil path that is located on the primary regulator valve PRV side is referred to as the second oil feed path PI2. Both of these oil paths PI1 and PI2 communicate substantially linearly.

Below, a more detailed explanation will be presented.

As shown in FIG. 3, FIG. 5, and FIG. 6, the projecting portion PP that projects on the discharge opening side of the oil pump OPm with respect to the upper valve body UVB is provided on the separating plate SP and the lower valve body LVB.

At the distal end side (the left side in FIG. 3, FIG. 5, and FIG. 6) of this projecting portion PP, a hydraulic oil receiving hole SPh, which receives the hydraulic oil that is discharged from the oil pump OPm from the case MC side, is provided in the separating plate SP, and the hydraulic oil receiving chamber PR, which communicates with the first oil feed path PI1, is provided below this hydraulic oil receiving hole SPh. In addition, a check valve CV is disposed so as to pass through the case MC, the hydraulic oil receiving hole SPh, and the hydraulic oil receiving chamber PR, and this check valve CV permits the flow of hydraulic oil from the case MC side to the hydraulic oil receiving chamber PR side, and prevents the reverse flow of the hydraulic oil from the hydraulic oil receiving chamber PR side to the case MC side.

The first oil feed path PI1 communicates with this hydraulic oil receiving chamber PR, receives the hydraulic oil from the oil pump OPm and guides the hydraulic oil to the upper valve body disposition side. As shown in FIG. 5, FIG. 8, and FIG. 9, the seal of this first oil feed path PI1 is established by providing the descending wall Wd that descends from the case MC at a position that opposes the upper end of the sealing wall portion (the end portion ascending wall) Ws of the lower valve body LVB, with the separating plate SP interposed between the descending wall Wd and the sealing wall portion Ws.

More specifically, both the sealing wall portion Ws and the descending wall Wd are structured as axial walls along axial direction of the drive apparatus 1. In addition, in addition to this sealing wall portion Ws, an axial oil path forming wall Wa is provided on the lower valve body LVB, where, in the axial oil path forming wall Wa, the first oil feed path PI1 is used as an axial oil path along the axial direction Da of the drive apparatus.

Here, as can be understood from FIG. 5, FIG. 8, and FIG. 9, a descending wall that descends from the case MC is not provided at a position that is opposed to this axial oil path forming wall Wa, with the separating plate SP interposed therebetween.

In contrast, although not illustrated, a structure is used in which, with respect to the axial oil path forming wall Wa, in relation to the location that forms the second oil feed path PI2, an opposing wall is provided on the upper valve body UVB, and the second oil feed path PI2 can be sealed more advantageously thereby.

In addition, in the present example, the sealing wall portion Ws forms an end portion ascending wall that is provided along the axial direction Da of the drive apparatus 1 at the end portion of the lower valve body LVB in the width direction Dw of the drive apparatus, the width direction Dw being perpendicular to the axial direction Da of the drive apparatus 1. The axial oil path forming wall Wa is provided more toward the inside than the end portion ascending wall Ws in the width direction Dw of the drive apparatus. In addition, a space Rb that is formed between the end portion ascending wall Ws and the axial oil path forming wall Wa communicates with the second oil feed path PI2 via the communicating hole oh. Thereby, this space Rb becomes an interference chamber for ensuring the interface pressure for the oil feed path PI. Specifically, the seal of this location is ensured by the sealing wall portion Ws and the descending wall Wd, and as a result, it is possible to ensure the interface pressure in the first oil feed path PI1 and the second oil feed path PI2. As shown in FIG. 5, a structure is used in which, in a plane view thereof, there is almost no gap between the descending wall Wd and the upper valve body UVB.

In this example, with respect to the communicating hole oh, both the space Rb and the second oil feed path PI2 are communicated by a communicating hole, which is formed as a comparatively long constricted passage, and thus it is possible to ensure the seal at this constricted passage as well. However, because the seal is ensured by the end portion ascending wall Ws and the descending wall Wd, the communicating hole oh may also be provided in the first oil feed passage PI1.

In addition, as shown in FIG. 5 and FIG. 7, the second oil feed path PI2 communicates with the downstream side of the first oil feed path PI1, and the second wall portion W2 that forms the second oil feed path PI2 along with the separating plate SP is provided on the lower valve body LVB. Furthermore, as explained above, a structure is used in which it is possible to ensure the seal between the separator SP and the second wall portion W2 in the second oil feed path PI2 by fastening the lower valve body LVB to the upper valve body UVB.

Second Embodiment

In the embodiment described above, with respect to the first oil feed path PI1, the seal with the oil feed path PI (the first oil feed path PI1 and the second oil feed path PI2) is ensured between the descending wall Wd that descends from the case MC and the end portion ascending wall Ws, which is provided along the axial direction of the drive apparatus at the end portion of the lower valve body LVB in the width direction Dw of the drive apparatus. With respect to the second oil feed path PI2, the seal with the oil feed path PI is ensured by the walls that are provided on the upper valve body UVB and the lower valve body LVB. However, in the following embodiment, the interface pressure of the oil feed path PI may be ensured by the axial oil path forming wall Wa and the descending wall Wd that descends from the case MC.

Figure 10:
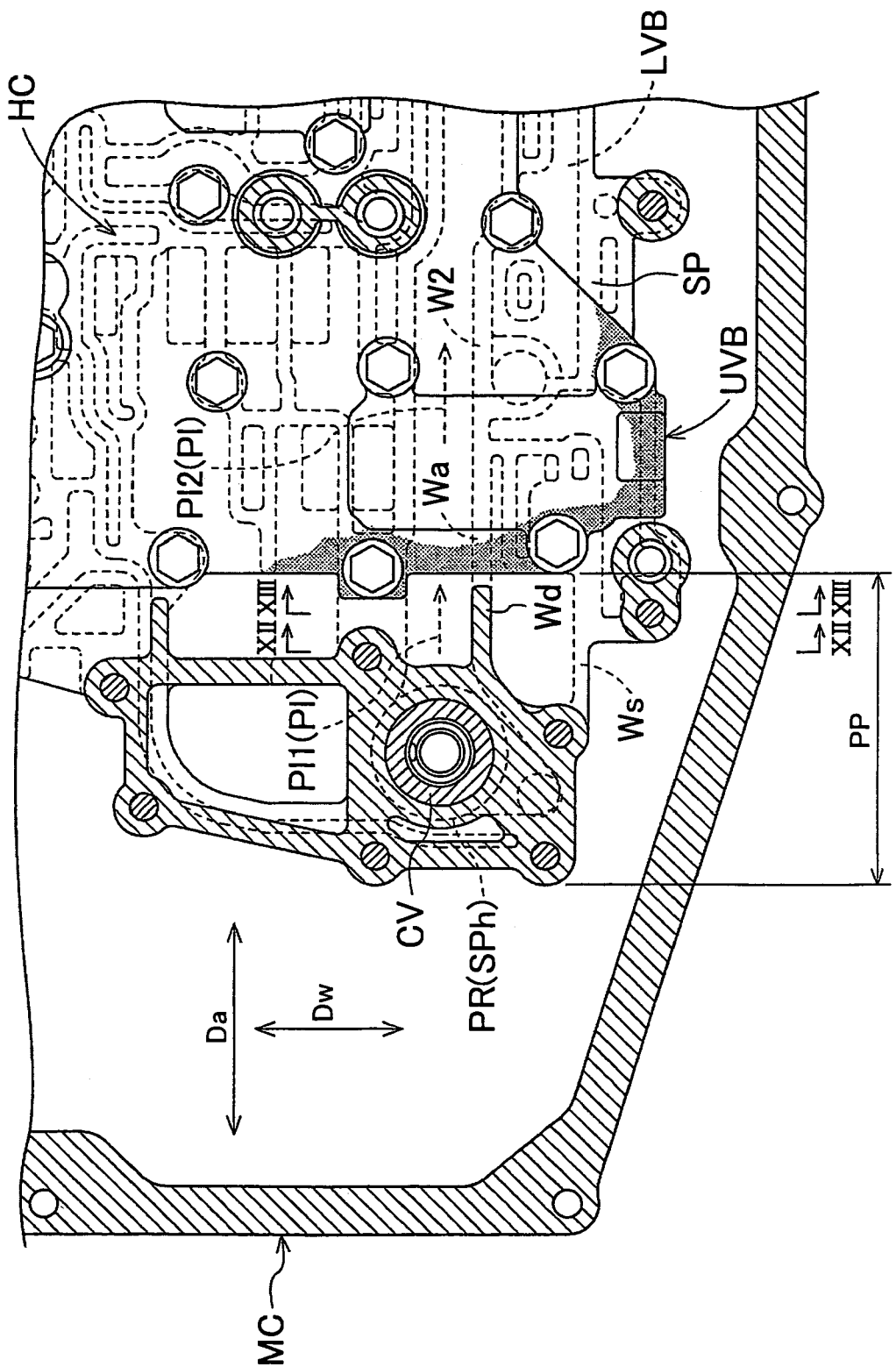
FIG. 10 is a plane view of an area in proximity to a portion of a second embodiment.
Figure 11:
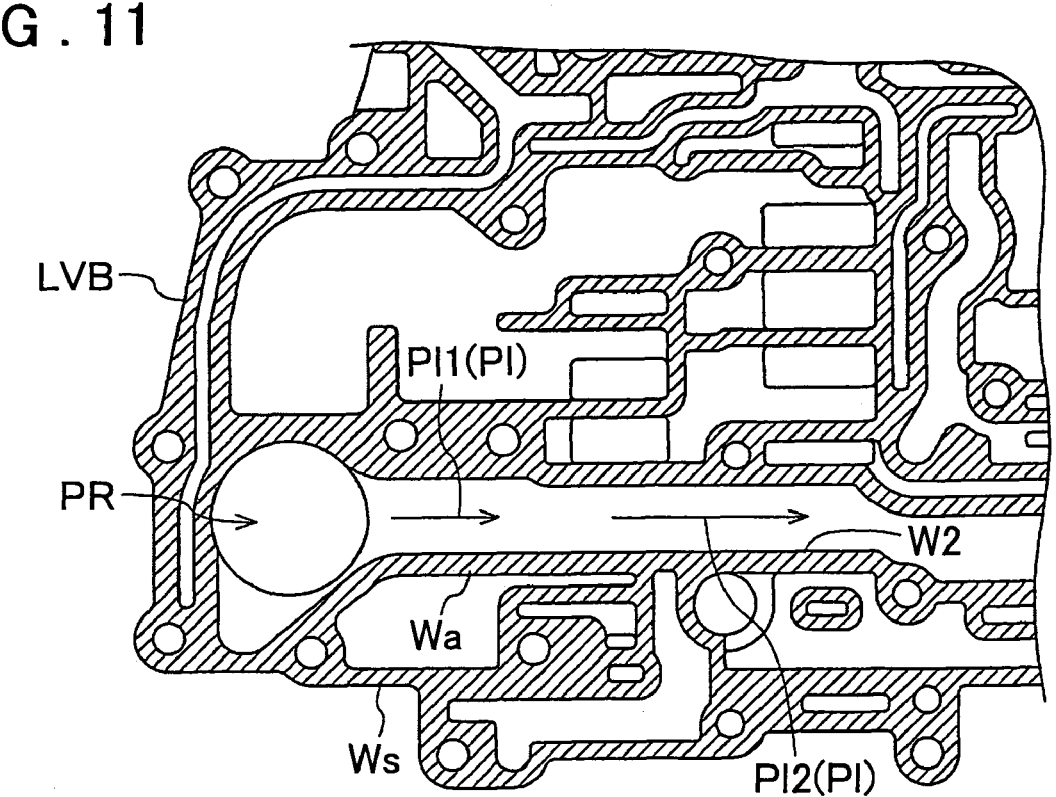
FIG. 11 is a drawing that shows a flow path structure of a lower valve body of the second embodiment.
Figure 12:
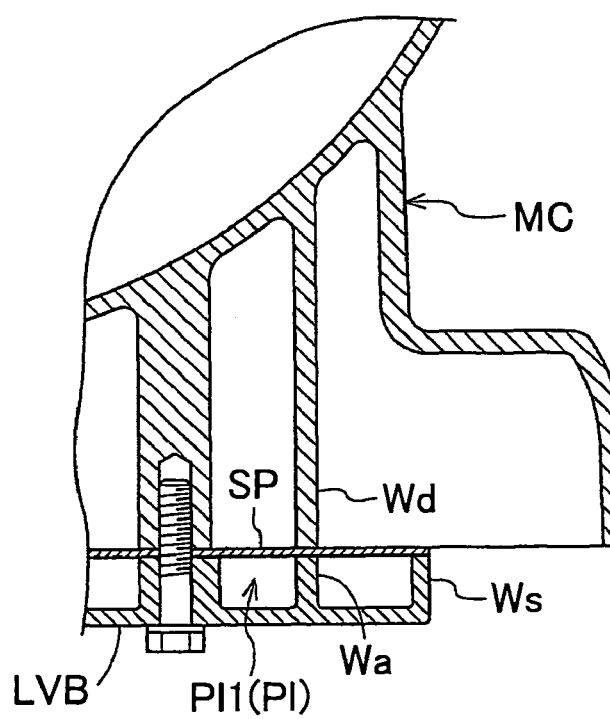
FIG. 12 is a drawing that shows a XII-XII cross-section in FIG. 10 according to the second embodiment.
Figure 13:
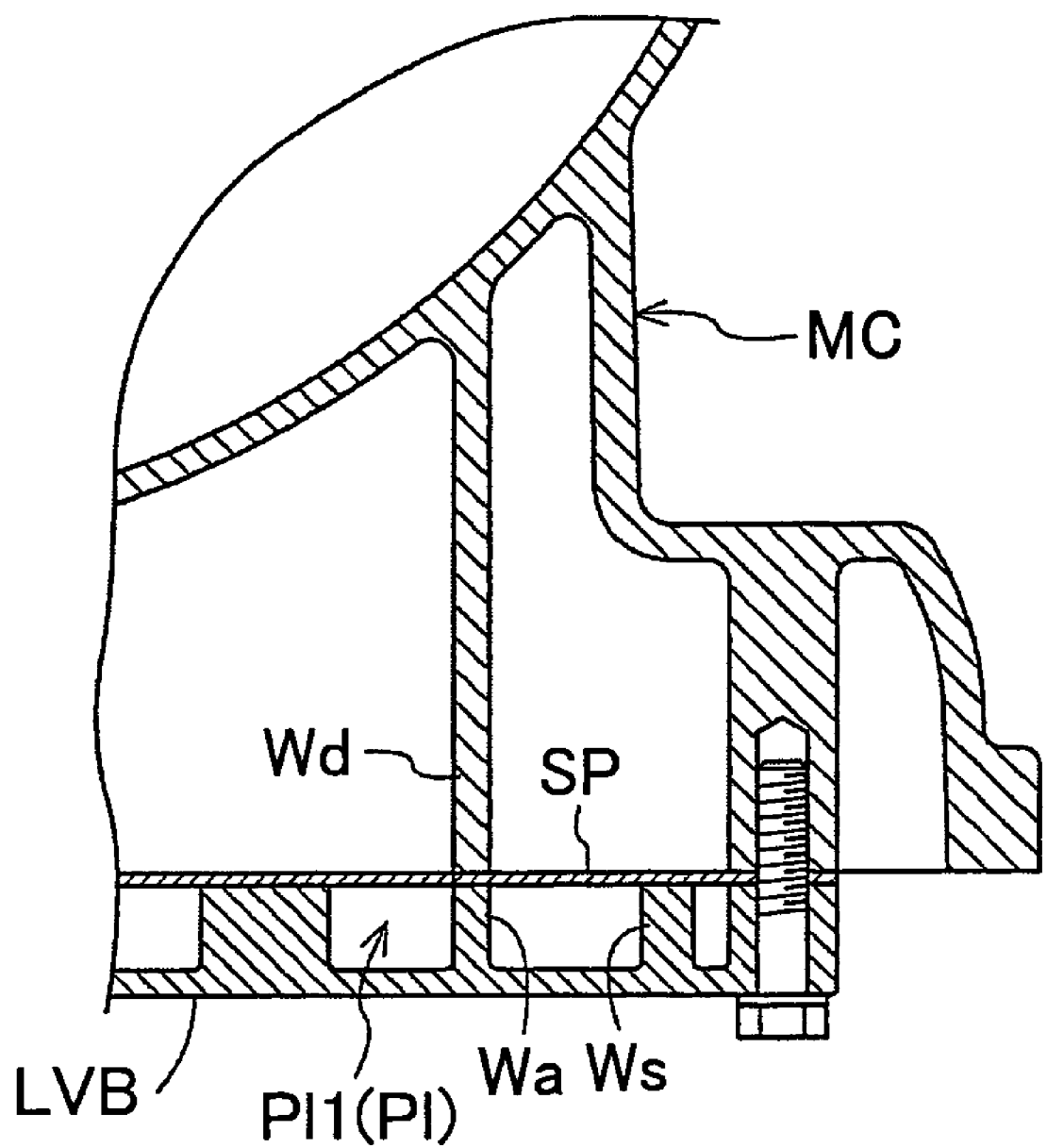
FIG. 13 is a drawing that shows a XIII-XIII cross-section in FIG. 10 according to the second embodiment.
Figure 14:
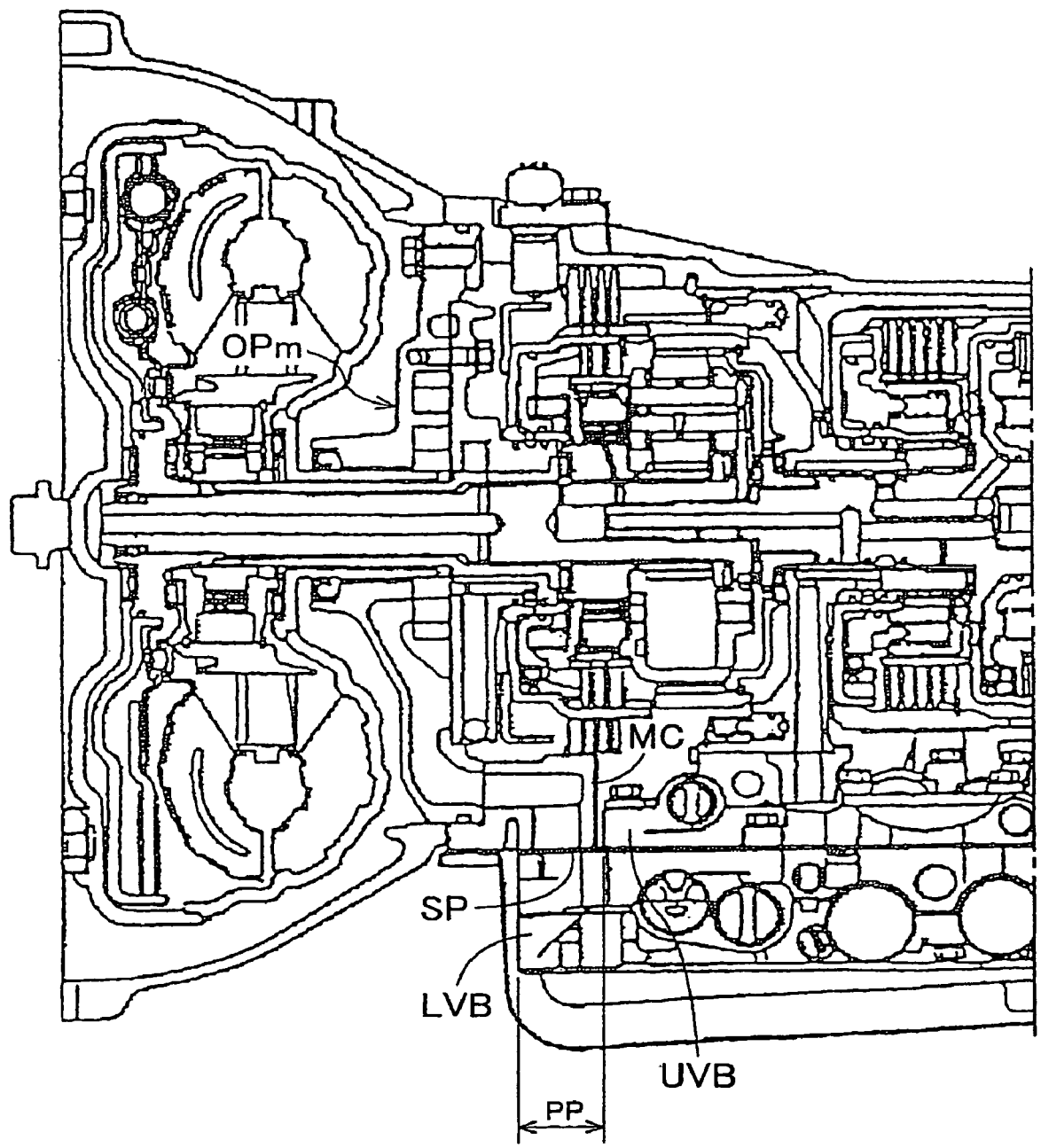
FIG. 14 is a drawing that shows a conventional positional relationship between the transmission case and the upper valve body.

An example of such a structure is shown in FIG. 10 to FIG. 13. FIG. 10 is a plane view that corresponds to FIG. 5 in the first embodiment; FIG. 11 is a drawing what shows the flow path of the lower valve body LVB that corresponds to FIG. 7 in the first embodiment; FIG. 12 is a drawing that shows the XII-XII cross-section in FIG. 10; and FIG. 13 is a drawing that shows the XIII-XIII cross-section in FIG. 10.

As can be understood from FIG. 10 and FIG. 12, in this example, the descending wall Wd is provided from the case MC side so as to be opposed to the axial oil path forming wall Wa that is provided on the lower valve body LVB. In this example, the axial oil path forming wall Wa and the second wall portion W2 form a continuous wall. In addition, in the present embodiment, this axial path forming wall Wa structures the sealing wall portion.

In this example, the descending wall that opposes the end portion ascending wall Ws in the first embodiment is not provided. However, in this example, as shown in FIG. 10, the descending wall Wd, which is provided so as to be opposed to the axial oil path forming wall Wa, is provided so as to extend in the axial direction Da of the drive apparatus 1 in sufficient proximity to the upper valve body UVB. Therefore, it is possible to ensure an advantageous seal for the separating plate SP on the oil pump OPm side by the case MC and the lower valve body LVB, and it is possible to ensure an advantageous seal for the separating plate SP on the primary regulating valve PRV side by the upper valve body UVB and the lower valve body LVB.

Alternative Embodiments (1) In each of the embodiments described above, an explanation was provided in relation to a drive apparatus in which both an engine E and motor-generators (rotary electrical motors) MG1 and MG2 are provided as drive power generating sources and that travel is carried out by obtaining drive power from either one or both of the drive power generating sources. However, the structure disclosed in the present application may be provided with only one of either the engine or the rotary electric motor as a drive power generating source.

(2) In each of the embodiments described above, a split-type hybrid drive apparatus that is provided with two rotary electric motors MG and MG is shown. However, in a similar hybrid drive apparatus, the number of the rotary electric motors or the configuration thereof can be freely selected.

(3) In the first embodiment described above, an example of a structure is shown in which the axial oil path forming wall Wa in which the first oil feed path PI1, which serves as an axial oil path along the axial direction Da of the drive apparatus, is provided separately from the sealing wall portion Ws. However, a structure in which such an axial oil path forming wall Wa is not provided is also one preferable embodiment of the present invention.

(4) The disposition and structure of the oil paths and the valves and the like according to each of the embodiments described above that are shown in the figures are simply one example, and naturally, dispositions of the oil paths and valves and the like that differ from those that are shown in these figures are possible.

The present invention can be advantageously used as an hydraulic oil supply structure in a hydraulic control apparatus in, for example, a vehicle drive apparatus and the like.

According to an exemplary aspect of the invention, in a hydraulic oil supply structure having a structure in which the distance between the oil pump and the hydraulic oil control apparatus is comparatively long, it is possible to ensure further the interface pressure for the seal of the first oil feed path that is provided at the projecting portion and receives the hydraulic oil from the oil pump and guides the same to the side at which the upper valve body is disposed by using a sealing wall portion and a descending wall, which is provided so as to descend from the case at a position that is opposed to the upper end of the sealing wall portion, where the separating plate is interposed between the sealing wall and the descending wall. Therefore, it is possible to guide the hydraulic oil advantageously from the oil pump into the hydraulic control apparatus.

According to an exemplary aspect of the invention, it is possible to ensure appropriately the seal of the first oil feed path that guides the hydraulic oil between the oil pump and the hydraulic control apparatus, which are disposed so as to be comparatively separated in the axial direction of the drive apparatus.

According to an exemplary aspect of the invention, it is also possible to ensure appropriately the seal for the second oil feed path that communicates with the downstream end of the first oil feed path.

According to an exemplary aspect of the invention, it is possible to use the first oil feed path as an axial oil path along the axial direction of the drive apparatus, and it is possible to decrease the resistance when the hydraulic oil passes through the first oil feed path.

According to an exemplary aspect of the invention, by using the sealing wall portion that is formed by the end portion ascending wall, it is possible to guarantee the seal at the end portion of the lower valve body in the width direction of the drive apparatus. In addition, by using the axial oil path forming wall inside in the width direction of the drive apparatus from the end portion ascending wall, it is possible to reduce the resistance when the hydraulic oil passes through the first oil feed path by using the first oil feed path as an axial oil path along the axial direction of the drive apparatus.

According to an exemplary aspect of the invention, by ensuring the seal in the space by using the sealing wall portion and the descending wall, the space becomes an interference chamber for ensuring the interface pressure of the first oil feed path and the second oil feed path, and as a result, it is possible to ensure the interface pressure in the first oil feed path and the second oil feed path.

According to an exemplary aspect of the invention, while ensuring the seal of the first oil feed path by using the axial oil path forming wall that serves as a sealing wall portion, due to this axial oil path forming wall, it is possible to reduce the resistance when the hydraulic oil passes through the first oil feed path by using the first oil feed path as an axial oil path along the axial direction of the drive apparatus.

According to an exemplary aspect of the invention, it is possible to prevent the reverse flow of the hydraulic oil from the lower valve body to the case side by using the check valve.

What is claimed is:

1. A hydraulic oil supply structure, comprising:
   an oil pump;
   a case for a drive apparatus; and
   a hydraulic control apparatus to which hydraulic oil that has been discharged from the oil pump is supplied and which is disposed in an area below the drive apparatus, wherein:
   the hydraulic control apparatus includes a separating plate that is interposed between an upper valve body and a lower valve body,
   the separating plate and the lower valve body provide a projecting portion that projects toward a discharge opening side of the oil pump with respect to the upper valve body;
   a first oil feed path is provided at the projecting portion, is formed between the separating plate and the lower valve body, is used as an axial oil path along an axial direction of the drive apparatus from the discharge opening side of the oil pump toward an upper valve body side, and receives the hydraulic oil from the oil pump and guides the hydraulic oil to the upper valve body side;
   a descending wall is provided that descends from the case at a position opposed to an upper end of an end portion ascending wall of the lower valve body, with the separating plate interposed between the descending wall and the end portion ascending wall;
   an axial oil path forming wall is provided on the lower valve body separately from the end portion ascending wall;
   the end portion ascending wall is provided along the axial direction of the drive apparatus on an end portion of the lower valve body in a width direction of the drive apparatus, the width direction being perpendicular to the axial direction of the drive apparatus;
   the axial oil path forming wall is provided inside, in the width direction, of the drive apparatus from the end portion ascending wall;
   the first oil feed path is provided inside, in the width direction, of the drive apparatus from the axial oil path forming wall; and
   a space is formed between the end portion ascending wall and the axial oil path forming wall that communicates with the first oil feed path.

2. The hydraulic oil supply structure according to claim 1, wherein both the end portion ascending wall and the descending wall are axial walls along the axial direction of the drive apparatus from the discharge opening side of the oil pump toward the upper valve body side.

3. The hydraulic oil supply structure according to claim 2, comprising:
   a second oil feed path that communicates with a downstream side of the first oil feed path, wherein:
   a second wall portion that forms the second oil feed path along with the separating plate is provided on the lower valve body; and
   the separating plate and the second wall portion in the second oil feed path is sealed by the lower valve body being fastened to the upper valve body.

4. The hydraulic oil supply structure according to claim 1, wherein:
   a hydraulic oil receiving hole that receives the hydraulic oil that is discharged from the oil pump from a case side is provided in the separating plate;
   a hydraulic oil receiving chamber is provided that communicates with the first oil feed path at a bottom side of the hydraulic oil receiving hole; and
   a check valve, which prevents reverse flow of hydraulic oil from a hydraulic oil receiving chamber side to a case side, is disposed so as to pass through the case, the hydraulic oil receiving hole, and the hydraulic oil receiving chamber.

5. The hydraulic oil supply structure according to claim 4, wherein a transmission is provided above at least a portion of the hydraulic control apparatus.

6. The hydraulic oil supply structure according to claim 5, wherein a rotary electric motor is provided between the oil pump and the transmission.

7. The hydraulic oil supply structure according to claim 5, wherein one or both of a rotational drive that is generated by an engine and a rotational drive that is generated by rotary electric motors is input to the transmission.

8. The hydraulic oil supply structure according to claim 1, comprising:

a second oil feed path that communicates with a downstream side of the first oil feed path, wherein:

a second wall portion that forms the second oil feed path along with the separating plate is provided on the lower valve body; and the separating plate and the second wall portion in the second oil feed path is sealed by the lower valve body being fastened to the upper valve body.

9. The hydraulic oil supply structure according to claim 1, wherein a transmission is provided above at least a portion of the hydraulic control apparatus.

10. The hydraulic oil supply structure according to claim 9, wherein a rotary electric motor is provided between the oil pump and the transmission.

11. The hydraulic oil supply structure according to claim 9, wherein one or both of a rotational drive that is generated by an engine and a rotational drive that is generated by rotary electric motors is input to the transmission.

12. A vehicle drive apparatus comprising the hydraulic oil supply structure of claim 1.

* * * * *